(12) United States Patent
Deolasee et al.

(10) Patent No.: US 8,285,835 B1
(45) Date of Patent: Oct. 9, 2012

(54) GRAPHICAL ANALYSIS OF STATES IN A COMPUTING SYSTEM

(75) Inventors: Pavan Deolasee, Pune (IN); Sachin Vaidya, Pune (IN); Bharat Dighe, Pune (IN); Vanita Bhatt, Pune (IN); Parag Thakur, Palo Alto, CA (US); Ming Xu, San Ramon, CA (US)

(73) Assignee: Symantec Operating Corporation, Mountain View, CA (US)

( * ) Notice: Subject to any disclaimer, the term of this patent is extended or adjusted under 35 U.S.C. 154(b) by 2370 days.

(21) Appl. No.: 11/040,439

(22) Filed: Jan. 21, 2005

(51) Int. Cl.
*G06F 15/173* (2006.01)
(52) U.S. Cl. .................................................. 709/224
(58) Field of Classification Search .................. 709/223, 709/224; 714/46, 57
See application file for complete search history.

(56) References Cited

U.S. PATENT DOCUMENTS

| | | | |
|---|---|---|---|
| 6,151,683 A | 11/2000 | Wookey | |
| 6,182,249 B1 | 1/2001 | Wookey et al. | |
| 6,742,141 B1 | 5/2004 | Miller | |
| 6,801,940 B1 | 10/2004 | Moran et al. | |
| 6,880,086 B2 | 4/2005 | Kidder et al. | |
| 6,920,502 B2 | 7/2005 | Araujo et al. | |
| 7,171,593 B1 * | 1/2007 | Whittaker et al. | 714/57 |

* cited by examiner

*Primary Examiner* — Derrick Ferris
*Assistant Examiner* — Farhad Ali
(74) *Attorney, Agent, or Firm* — Rory D. Rankin; Meyertons, Hood, Kivlin, Kowert & Goetzel, P.C.

(57) ABSTRACT

A system and method for visually depicting component states in a computing system. A graphical analysis tool includes a graphical user interface for use in viewing the history of a selected component. A user selects a system component for viewing and then using a timeline "drags" the state of the selected component to various points on the timeline in order to view states of the component at the selected point in time. States of the selected component may also be played forward or backward in a continuous manner. Logging agents in the system are configured to log data corresponding to detected events and forward the log data to a central repository. The analysis tool may access the data in the repository for use in creating visual displays. Point-in-time snapshots of a component may also be stored in the central repository and used to reproduce the history.

20 Claims, 6 Drawing Sheets

GRAPHICAL ANALYSIS OF STATES IN A COMPUTING SYSTEM

BACKGROUND

1. Field of the Invention

This invention relates to computing systems and, more particularly, to techniques for analyzing a history of changes in a system.

2. Description of the Related Art

In recent years, organizations have become increasingly dependent upon the proper operation of both computer hardware and software. Many business organizations and governmental entities rely upon applications that access large amounts of data, often exceeding a terabyte or more of data, for mission-critical applications. Many of these applications require near-continuous access to data. For example, many systems such as retail processing databases, airline reservation databases, and financial institution databases must be available to perform transaction processing 24 hours a day. Downtime associated with such systems can be disastrous. Accordingly, maintaining the proper operation and availability of the system and its applications is critically important.

In addition to the above, some of the tasks of managing a computing system include that of server provisioning and restoring a system to a particular operating system and applications configuration or state. Because downtime in an organization can severely impact operations, the ability to deploy additional servers, replace failed servers, or restore a previous state as quickly as possible can be critical. Certain tools, such as VERITAS's multi-platform server-provisioning software OpForce®, may be used to facilitate rapid deployment of added servers, replacement of failed servers, or restoration of a previous configuration state. One of the services provided by the OpForce® product is the creation of a snapshot of a particular server installation. That snapshot may contain all of the server's information, including the operating system and its settings, and all of the installed applications and personalization information. By referencing and applying a previously created snapshot, a previous state may be restored or new hardware may be rapidly deployed and configured to replace a failed server. In addition, one or more snapshots for known good default configurations may be stored for rapid deployment of additional servers.

In view of the above, it is critical that the cause of an application failure or a system aberration be quickly identified and remedied. However, diagnosing the causes of such problems can be very difficult. Typically, a system administrator may be required to study logs to determine the past history and generally engage in a root cause analysis (RCA). However, as may be appreciated, such an approach may be very time consuming and relatively inefficient.

Accordingly, methods and mechanisms which facilitate such an analysis are desired.

SUMMARY

A graphical analysis tool is contemplated which may be used to assist studying system events and transitions. In one embodiment, the tool enables a relatively natural way of studying history of a system.

In one embodiment, a graphical analysis tool is contemplated which includes a graphical user interface for use in viewing the history of a selected component. In one embodiment, the interface includes a "timeline" which can be set to a desired scale (hours/days/weeks etc). A user may select a particular system component for viewing and then using the timeline "drag" the state of the selected component to various points on the timeline in order to view states of the component in the past. In addition to displaying past states, the following history may be visually "replayed" whereby the interface shows changes in the component over time.

Also contemplated are logging agents for various components with the system. The logging components are configured to log data corresponding to detected events within a given component. The logged data may also be forwarded to a central repository where log data within the system is consolidated. The graphical analysis tool may then access the log data in the central repository for use in creating visual displays.

Also contemplated is an agent configured to create point-in-time snapshots of system, component, and application object states. The snapshot data may also be stored in the central repository and used to reproduce the history. In gathering the snapshot data, the agent may be configured to perform a discovery procedure within the computing system.

In one embodiment, log data entries in the central repository may include a "log sequence number". Each entry has an associated log sequence number which is monotonically increasing. Using the snapshot and application logs starting from a particular log sequence number, the traversal of states and events in a proper temporal order may be achieved.

Still further, in one embodiment, a user may capture a configuration for a particular point in time of a selected component. The captured configuration may then be stored in a configuration file.

Other embodiments and aspects of the invention may be obtained by reference to the following description and drawings.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Figure 1:
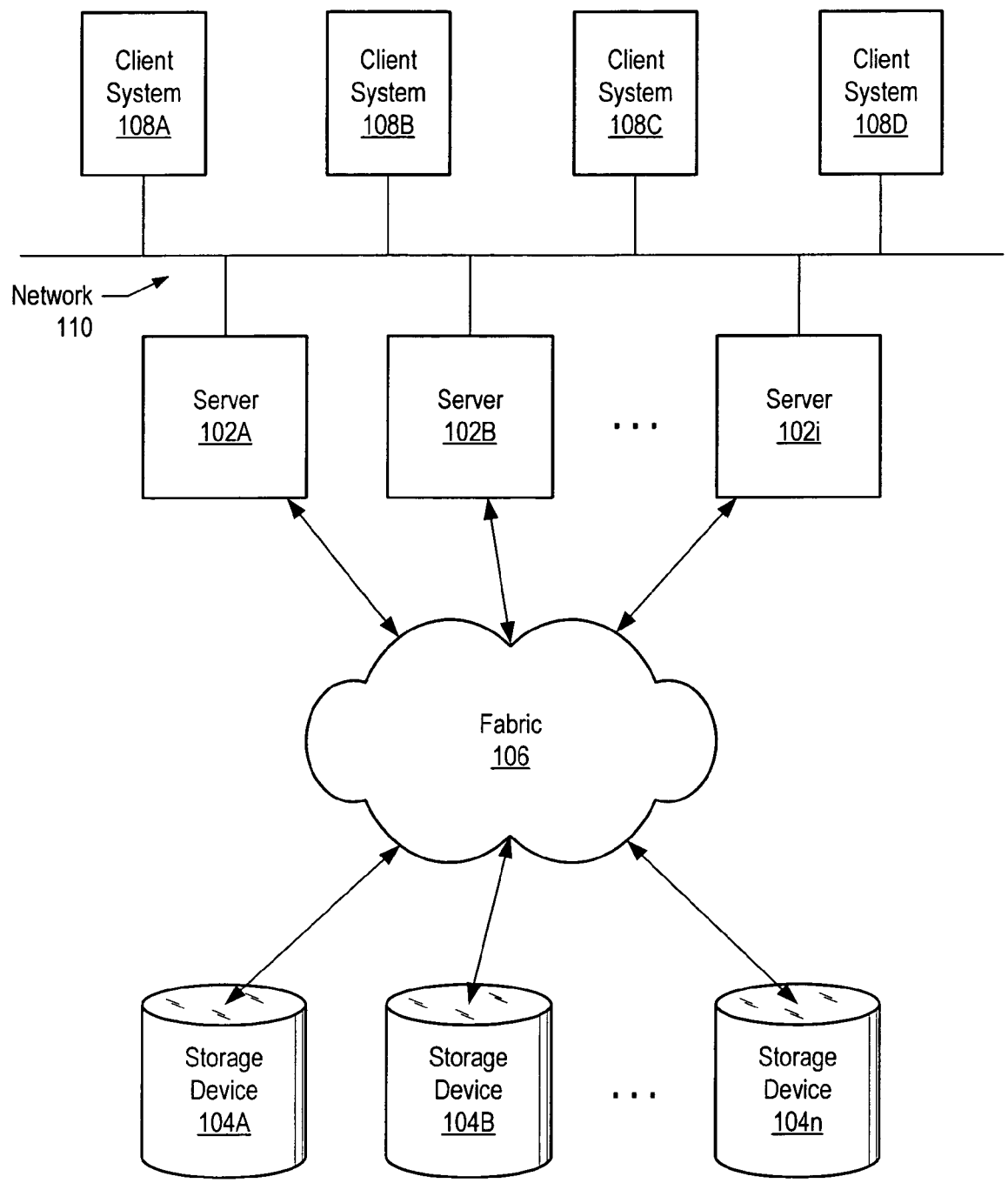
FIG. 1 is a block diagram illustrating one embodiment of a computing system.

FIG. 1 illustrates one embodiment of a computer system. In the illustrated embodiment, a storage area network (SAN) environment is formed by one or more host systems or servers 102 (e.g., servers 102A, 102B and 102i) that are interconnected with one or more associated storage devices 104 (e.g., storage devices 104A, 104B . . . 104x) through an interconnect fabric 106. One or more client systems 108A-108D may access the SAN by accessing one or more of the servers 102 via a network 110. Network 110 may include wired or wireless communication mechanisms such as, for example, Ethernet, LAN (Local Area Network), WAN (Wide Area Network), or modem, among others. Note that throughout this disclosure, drawing features identified by the same reference number followed by a letter (e.g., servers 102A-102i) may be collectively referred to by that reference number alone (e.g., servers 102).

Each of the storage devices 104 may include any of one or more types of storage devices including, but not limited to, storage systems such as RAID (Redundant Array of Independent Disks) systems, disk arrays, JBODs (Just a Bunch Of Disks, used to refer to disks that are not configured according to RAID), tape devices, and optical storage devices. It is noted that as used herein, "storage device" may include a variety of mechanisms. For example, also included may be network based volume managers and other types of devices which provide volume and copy management services. For example, volume and copy management services may be provided in a switch rather than in the storage device (array). These devices may be products of any of a number of vendors including, but not limited to, Compaq, EMC, and Hitachi. Servers 102 may run any of a variety of operating systems such as a Unix operating system, Solaris operating system, or a Windows operating system. Each server 102 may be connected to the fabric 106 via one or more Host Bus Adapters (HBAs).

Fabric 106 includes hardware that connects servers 102 to storage devices 104. The fabric 106 may enable server-to-storage device connectivity through Fibre Channel switching technology. The fabric 106 hardware may include one or more switches (also referred to as fabric switches), bridges, hubs, or other devices such as routers, as well as the interconnecting cables (e.g., for Fibre Channel SANs, fibre optic or copper cables), as desired.

In one embodiment, the SAN may use the Network File System (NFS) protocol to provide access to shared files on the SAN. Using NFS, each server 102 may include a logical hierarchy of files (e.g., a directory tree) physically stored on one or more of storage devices 104 and accessible by the client systems 106 through the server 102. These hierarchies of files, or portions or sub-trees of the hierarchies of files, are referred to herein as "file systems." In one embodiment, the SAN components may be organized into one or more clusters to provide high availability, load balancing, and/or parallel processing. For example, in FIG. 1, a selected set of the servers 102A, 102B . . . 102i may be operated in a cluster configuration.

It is noted that while in the embodiments described above, primary host 102a may be coupled to a plurality of storage devices through a storage area network, other embodiments are possible in which primary host 102a is coupled directly to dedicated storage devices.

Figure 2:
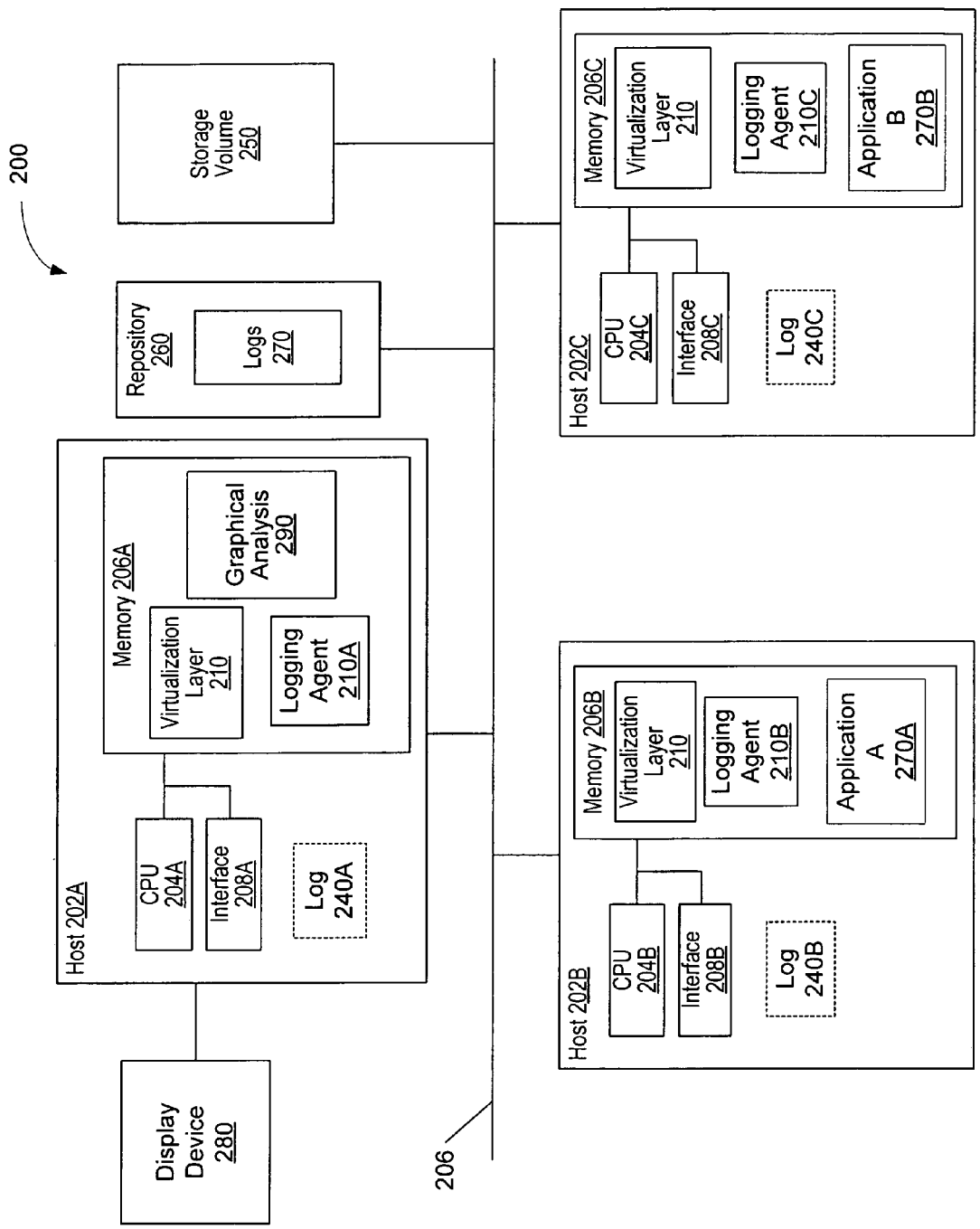
FIG. 2 depicts one embodiment of a computing system including a central log repository.

FIG. 2 illustrates an alternative view of a computer system 200 such as that depicted in FIG. 1. FIG. 2 shows several hosts 202A-202C (collectively, hosts 202) coupled by one or more communication interconnects 206 to one or more storage volumes 250 and a repository 260. As used herein, the term "host" refers to any computing device that includes a memory and a processor configured to execute instructions stored in the memory, or to any integrated circuit (e.g., an FPGA (Field Programmable Gate Array) or ASIC (Application Specific Integrated Circuit)) configured to perform the functions specified by such instructions, or any mechanical device configured to perform such functions.

Each host 202 may include various conventional software and hardware components. For example, hosts 202 may run any of a variety of operating systems such as a UNIX operating system such as the Solaris® operating system, a Linux® operating system, or a Windows® operating system. Hosts 202A-202C are illustrated with one or more processors 204 as well as a main memory 206 for storing instructions and/or data accessible by the processors 204. In one embodiment, main memory 206 is implemented using dynamic random access memory (DRAM), although it is noted that in other embodiments, other specific types of memory or combinations thereof may be utilized. Hosts 202A-202C may also each include one or more interfaces (208A-208C) for interfacing with other hosts, clients, and/or storage devices (on which the storage volume(s) 250, repository 260, and/or logs 240A-240C may be implemented) via communication interconnect(s) 206.

FIG. 2 further illustrates various software components executable by processors 204 out of a memory medium such as main memory 206. In one embodiment, the software components include a virtualization layer 210. It is noted that these software components may be paged in and out of main memory 206 from a secondary storage medium according to conventional techniques. The virtualization layer 210 of FIG. 2 includes functionality to virtualize the physical storage accessible by applications running on hosts 202. The virtualization layer 210 may support various specific storage management functionality, such as various levels of RAID functionality, data mirroring, and/or replication. In some embodiments, the virtualization layer 210 may be part of a volume manager application. As used herein, the term "volume manager" broadly refers to software that may select and combine storage space from one or more physical storage devices into a logical volume. In one embodiment, the volume manager is a Veritas Volume Manager™ product available from Veritas Software Corporation.

In the illustrated embodiment, the hosts 202 communicate with storage volume(s) 250 via interconnect 206. Each volume 250 may be accessed by user applications (e.g., database applications) executing on hosts 202 through the virtualization functionality provided by virtualization layer 210. It is noted that each volume 250 may correspond to a partitioning and/or aggregation of physical storage provided by one or more storage devices including, but not limited to, single storage devices (e.g., disk drives), storage systems such as RAID (Redundant Array of Independent Disks) systems, disk arrays, JBODs (Just a Bunch Of Disks, used to refer to disks that are not configured according to RAID), tape devices, and optical storage devices. These devices may be products of any of a number of vendors including, but not limited to, Compaq, EMC, and Hitachi. A volume 250 may be formed from a portion of the overall storage of a physical device, from the storage of an entire physical device, or from the storage of multiple physical storage devices combined.

The virtualization layer 210 may perform block operations in response to read and write requests generated by applications executing on each host 202. In particular, the virtualization layer 210 may perform the various complex underlying block operations (e.g., parity calculations and striping for RAID, writing multiple copies of data for mirroring, data movement to implement snapshots and/or replication, etc.) implemented on the storage volume(s) 250 while allowing applications to interface with the storage volume(s) 250 using basic read and write operations. In other words, the virtualization layer 210 may operate to abstract the complexities of the underlying block storage features away from the applications accessing storage volumes 250. The virtualization layer 210 may allow applications to access storage volumes 250 as an array of fixed-size readable and writeable logical blocks. As used herein, a block is a unit of storage (e.g., a 512 byte block) that may be written or read as a single I/O operation.

In one embodiment, each host 202 has a corresponding log file 240A-240C. As used herein, a "log" file generally refers to a file which stores messages and/or status information corresponding to hardware and/or software elements within a system. Accordingly, "logging" may be used to refer to the act of writing data to such a log. For example, during execution, an application 270A executing on host 202B may attempt to access a file which does not exist. In response to determining the file does not exist, the application 270A may generate a message which is stored in a log file 240A and indicates the attempted, but failed, file access. Alternatively, an application may be configured to store status information in a log file on a periodic or predetermined basis which indicates a current state and/or configuration of the application.

In addition to the above, data stored in a log file may provide information related to hardware elements within a system. For example, the particular configuration of a particular host 202, or computing cluster and the status of its constituent elements, may be logged to a log file. A wide variety of such messages and status information may be generated and stored by an application. All such varieties of messages and information are contemplated. In addition, it is noted that the logs 240 depicted may comprise one or more files. In one embodiment, logs 240 may be stored in non-volatile storage.

In the embodiment shown, each host 202 is shown to include a logging agent 210A-210C. Logging agents 210 are generally configured to generate messages and information such as that described above which is stored in one or more logs 240. For example, logging agent 210A may be configured to store messages and information in log 240A. Similarly, logging agent 210C may be configured to store messages and information in log 240C. Logging agents may comprise any suitable combination of hardware and/or software elements. In addition, while logging agents 210 are shown as separate entities, logging agents 210 may be integrated with other components of a system. For example, logging agent 210B may comprise executable code which is part of application A 270A. In one embodiment, logging agents 210 may comprise application code which is separate from applications within the system. In such an embodiment, applications as well as logging agents may write to log files.

Also shown in FIG. 2 is a repository 260 which includes logs 270. Repository 260 is shown separately for ease of discussion. However, it is noted that repository 260 may included as part of storage volumes 250 or otherwise as deemed suitable. In one embodiment, logs 270 comprise information corresponding to one or more of the logs 240 within the system. In this manner, repository 260 may represent a centralized location for storage of messages and information which has been logged within the computing system.

In one embodiment, messages and information stored within a log 240 of a particular host 202 may also be written to logs 270. For example, a logging agent 210B may be configured to periodically examine log 240B and convey corresponding information to logs 270 within repository 260. In such an embodiment, log 240B may generally include information corresponding to host 202B, while logs 270 may include information corresponding to multiple hosts 202 within the system 200. In an alternative embodiment, applications and/or logging agents may be configured to write messages and information directly to the logs 270 in the repository 260. Repository 260, or agents within the system 200, may include any suitable mechanism (e.g., semaphores, lock files, etc.) for controlling accesses to the logs 270.

As described above, data (i.e., messages and information) stored in logs 240 and/or logs 270 may be performed on a periodic or otherwise scheduled basis. For example, in one embodiment, application A 270A may write data to log 240B as events within the application 270A or host 202B warrant. For example, if an attempted file access fails, a message corresponding to the failed access may be written to log 240B at the time of (or immediately following) the failure. Similarly, logging agent 210B may also write data to log 240B as events within the host 202B warrant or are otherwise dictated. For example, logging agent 210B may be configured to take a "snapshot" of the host 202B on a periodic basis and store corresponding data in the log 240B. Such a snapshot may include information including the applications running or stored on the host 202B, the hardware configuration of the host 202B, personalization information of the host 202B, internet protocol addresses corresponding to the host 202B, other configuration information, and so on. Further, the data written to log 240B may also (or alternatively) be written to logs 270.

In one embodiment, logging agent 210B is configured to write data to logs 270 on a predetermined, or an event driven, basis. An example of an event may be the detection of a change in application version, hardware configuration, or otherwise. Data stored in logs 270 may be identical (i.e., a straight copy) or data stored in logs 240. Alternatively, data stored in logs 270 may be modified in some respects as compared to the data stored in logs 270. For example, when data is "copied" from a log 240 to logs 270, it may be bounded by information which indicates the host to which it corresponds, the time it was written to logs 270, etc. In addition, the data written to logs 270 may be reformatted to facilitate later processing as discussed further below.

As may be appreciated, logs 240 may provide a system administrator the ability to review such logs to determine past events, or other historical data concerning a particular host or system. In one embodiment, each log 240 is accessible by more than one host 202 in the system. Accordingly, each log 240 may be accessible by at least one other host 202 in the event of the failure of a host. In some embodiments, each log 240 may be accessible by each host 202 (e.g., via interconnect 106).

Also shown in host 202A of FIG. 2 is a graphical analysis unit 290. In addition, a display device 280 is coupled to host 202A. Graphical analysis unit 290 is generally configured to access logged data within system 200 and provide various graphical depictions of the data. In one embodiment, graphical analysis unit 290 comprises executable software within host 202A. However, those skilled in the art will appreciate that graphical analysis unit 290 may comprise any suitable combination of hardware and/or software.

Figure 3:
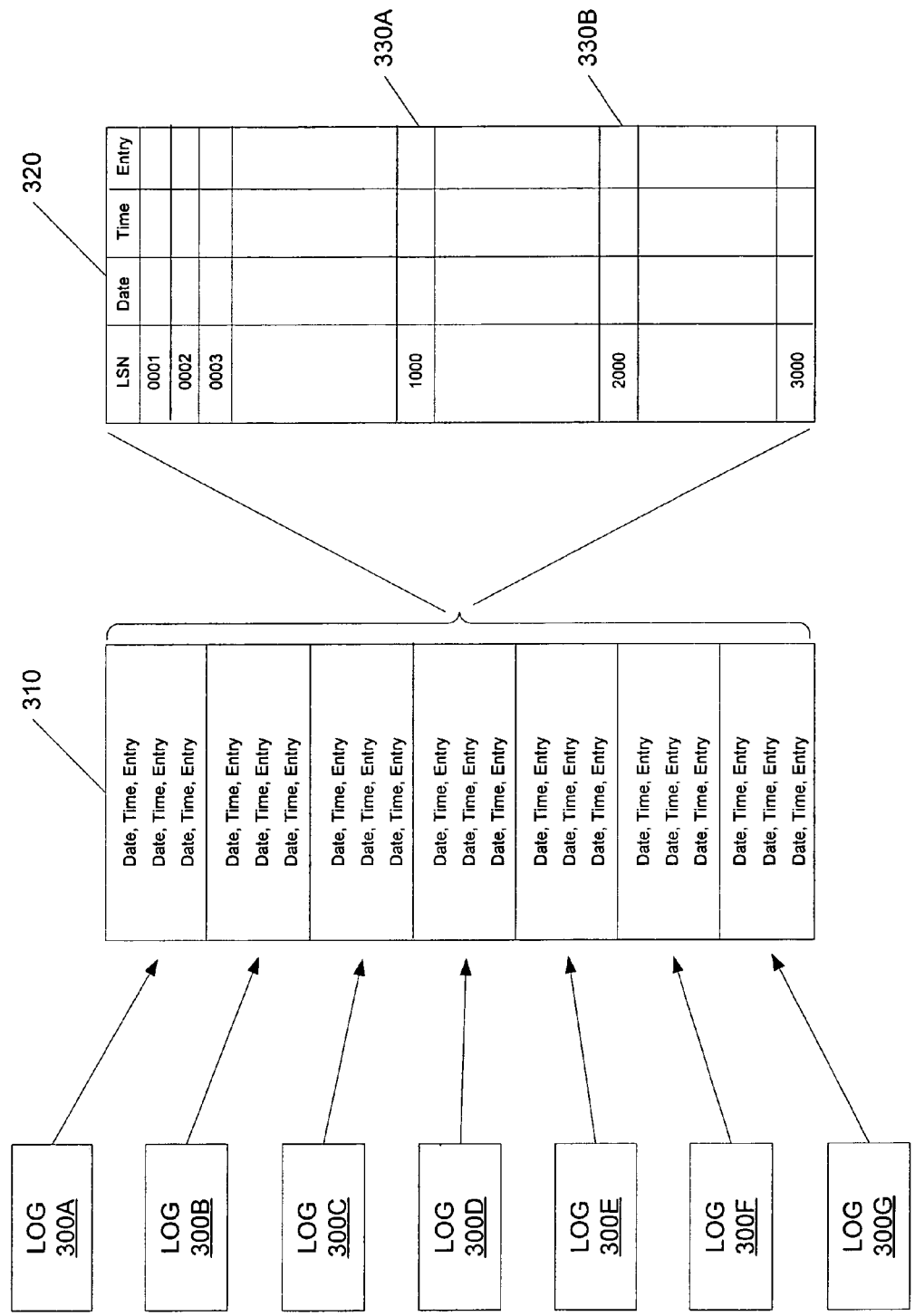
FIG. 3 illustrates one embodiment of a number of logs and entries in a repository.

Turning now to FIG. 3, an illustration of various log files, entries, and a central repository are shown. In the example shown, multiple log files 300A-300G have been created on one or more hosts or entities within a system. As shown by block 310, each log 300 may generally comprise multiple entries. In addition, each entry may include date and time information in addition to a particular message which is being logged. Any data deemed suitable may be included. Also shown is a central repository 320 which stores data corresponding to the logs 300. In the example shown, the repository 320 includes multiple columns of data including a Date, Time, and Entry. Date and Time data may include information for the date and time the entry was originally logged in a host, the date and time of the event giving rise to the logged data, the date and time the data was stored in the repository 320, or any desired combination. The Entry column may itself comprise multiple columns of information which indicates the source host or entity of the data, the specific data which was logged, and so on.

In addition, an identifier "LSN" is included in the repository 320. In one embodiment, the identifier is a Log Sequence Number (LSN) which generally represents the order in time at which a particular message was logged or corresponding event occurred. As discussed above, data which is logged for a particular event does not necessarily correspond to the time an event occurred or the order in which events occurred. For example, within a particular host an event A may precede an event B, but data corresponding to event B may be logged prior to that for event A. In such a case, the time the data was logged would not correspond to the order in which the events occurred. Such a distinction between the occurrence of an event and the time of logging may generally be noted and accounted for by the data logged in the repository 320. Accordingly, in one embodiment, the log sequence number may generally correspond to the time of the event or occurrence giving rise to a particular message, rather than the time at which it was logged. In such an embodiment, the log sequence numbers represent the order of events, message, or occurrences within a system. Therefore, while in the example above, event B was logged prior to event A, data corresponding to event A may receive an earlier log sequence number than event B because event A occurred prior to event B. In this manner, log sequence numbers may indicate a progression of events or state of a system through time. Therefore, the entry corresponding to LSN "1000" 330A represents an earlier period in time than the entry corresponding to LSN "2000" 330B. In addition, the entries within repository 320 are not necessarily physically stored in the order of their log sequence number (i.e., they are not necessarily sorted in ascending order of LSN). However, generally speaking, data within the repository 320 may be sorted and filtered in any number of ways.

As described above, logging agents 210 may be configured to generate snapshots which provide information such as the applications running or stored on a host, the hardware configuration of a host, personalization information, and so on. In an alternative embodiment, a single agent may be configured to generate a snapshot which includes information for multiple hosts with a system, or even an entire system. In such an embodiment, the agent may be configured to perform a discovery procedure whereby various hosts and entities within are system are queried for the desired information. Subsequent to gathering the information, the agent may then create a corresponding entry (or entries) in a log. For example, In the system 200 of FIG. 2, logging agent 210A may be configured to periodically perform discovery and create such snapshots. The logging agent 210A may then store corresponding data in the central repository 260. In one embodiment, entries in the repository 320 of FIG. 3 which correspond to these snapshots may include identifying information which identifies them as snapshot entries.

Figure 4:
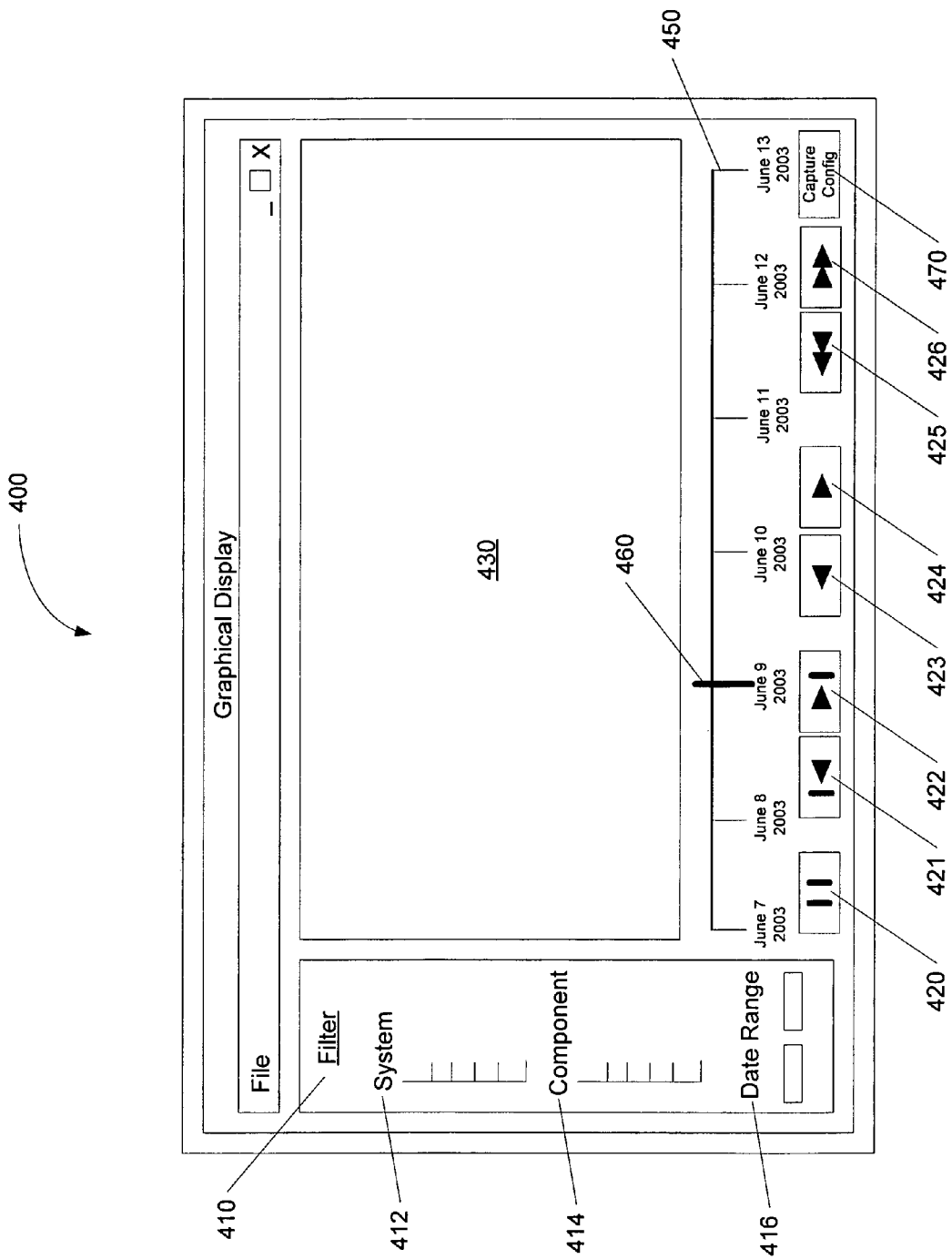
FIG. 4 depicts one embodiment of an interface for use in analyzing system state transitions.

FIG. 4 depicts one embodiment of a graphical display 400 which may be generated by a graphical analysis unit such as graphical analysis unit 290 in FIG. 2. Graphical analysis unit 290 is generally configured to utilize and display information in display region 430 corresponding to data stored within a repository (e.g., repository 260 of FIG. 2, or repository 320 of FIG. 3). The visual depiction of information displayed in the region 430 may comprise graphic and/or textual depictions. It is to be understood that the particular display 400 shown in FIG. 4 is intended to be illustrative only. Those skilled in the art will appreciate there are numerous alternative graphical interfaces and displays which may be created. All such alternatives are contemplated. Generally speaking, the graphical display provided allows a user (e.g., a system administrator) to select a particular system or component for viewing, and view the state of the selected system or component while moving forward or backward in time. In this manner, the user may view the state of an entity as it progresses through time. In so doing, the user may discern aspects of the system and/or occurrences/events within the system which facilitate resolution of a failure or aberration. Alternatively, a user may utilize such an approach to simply study the evolution of a particular system. Any number of purposes may be served by studying the presented information.

In the example shown, the interface includes a Filter 410 panel which allows a user to select a particular system 412 or component 414 for examination. For example, a particular host system 412 may be selected. Responsive to selection of a particular host system, the various components 414 of the selected system may be displayed. Components may include hardware and/or software components. In addition, a user may specify a particular date range 416 they wish to view. Responsive to selecting a particular date range, a corresponding timeline 450 may be displayed. In the example shown, the date range Jun. 7, 2003-Jun. 13, 2003 has been selected. In addition, a marker 460 is shown on the timeline 450 which indicates the point in time currently being displayed in region 430. In one embodiment, marker 460 may be "dragged" by a user (e.g., using a mouse) forward or backward along the timeline. In addition, the marker 460 may move along the timeline 450 responsive the actions taken with respect to one or more of the buttons as described below. Also shown in the display are "buttons" representative of actions which may be taken with respect to the information displayed in region 430 which may display text and/or graphical information. In one embodiment, the buttons may be selectable via mouse and/or keyboard in a conventional manner. However, other ways of indicating the actions depicted by the buttons are contemplated as well.

In one embodiment, the buttons generally represent actions similar to those which may be taken with a VCR or DVD player. For example, there is a pause button 422, a step backward button 423, a step forward button 424, a play backward button 423, a play forward button 424, a fast reverse button 425, and a fast forward button 426. Pressing the step forward button 422 may advance the marker in relatively small increments of time, such as by minute, by hour, or by day. Pressing a step button (421, 422) causes the marker to move a single increment and stop. The particular size of a step increment may be relative to the range of dates chosen. For example, if a one year range of dates is chosen, a step increment may be larger than if a one week range of dates is chosen. Similar actions may be taken by the step backward button 421, except that the marker would move backward in time. Alternative embodiments may provide an option which allows the explicit selection of a step size. The reverse 423 and forward 424 buttons may generally cause the marker 460 to move in a continuous fashion. For example, if the marker 460 is positioned at the beginning of the timeline 450, pressing the play forward button 424 may cause the marker to begin advancing, and continue advancing, until it reaches the end of the timeline 450. The play reverse button 423 would then work in a similar fashion, except in reverse. The fast reverse button 425 and fast forward button 426 may cause the marker to move in a continuous fashion similar to that of the play reverse 423 and play forward 424 buttons, except at a more rapid rate and/or alternatively in larger increments. Using these buttons, a user may freely move forward and backward in time through information indicative of states of a selected system to view.

As noted above, the graphical analysis unit may utilize the data stored within a repository (260, 320). In the example repository 320 of FIG. 3, log sequence numbers were used to indicate the ordering of events and/or data in time. Utilizing the LSNs, the graphical analysis unit may efficiently identify and determine the order of events in a system. For example, in FIG. 4 a date rage 416 has been chosen to be Jun. 7, 2003-Jun. 13, 2003. Based upon this date range and the selected system 412 and component 414, the graphical analysis unit may identify all repository 320 entries corresponding to the selected system/component which are dated within the date range Jun. 7, 2003-Jun. 13, 2003 (or the closest entries to that date if there is not an exact match). The LSNs which correspond to the identified entries may then serve to indicate a proper ordering for the entries. In addition, the LSNs of the identified entries may also serve as indices to the corresponding entries and may facilitate rapid indexing. Generally speaking, such LSNs may be generated at random times (i.e., generation of the LSNs has not be prescheduled). Consequently, the actual time difference between sequential LSNs in a series of LSNs may not correspond to a fixed period of time. In an alternative embodiment, additional identifiable LSNs may be automatically generated on a periodic or otherwise predetermined basis. If such "scheduled" identifiable LSNs are generated at known time intervals, then the time between such identifiable LSNs may be readily determined.

Numerous such alternatives are possible and are contemplated. In addition to the above, a "Capture Config" button 470 is also shown in FIG. 4. In one embodiment, a user may press the capture config button 470 to capture and store a configuration of the system or component currently displayed in the display region 430. For example, a selected component 414 may be a software component. Using the interface, a user may select a particular date for viewing in the region 430. The user may then decide to capture the configuration details of the application as they existed at the time depicted in the region 430. The captured configuration data may then be stored in a file and subsequently used for review, or even to reconfigure the application to a known good state. Similar configuration data may be captured for a wide variety of components in a system. Accordingly, not only may a user (e.g., system administrator) use the graphical display 400 to engage in analysis, but the tool may also be used to capture and store corresponding configuration data which may serve to reconfigure components, and potentially reduce downtime in the event of a failure.

Figure 5:
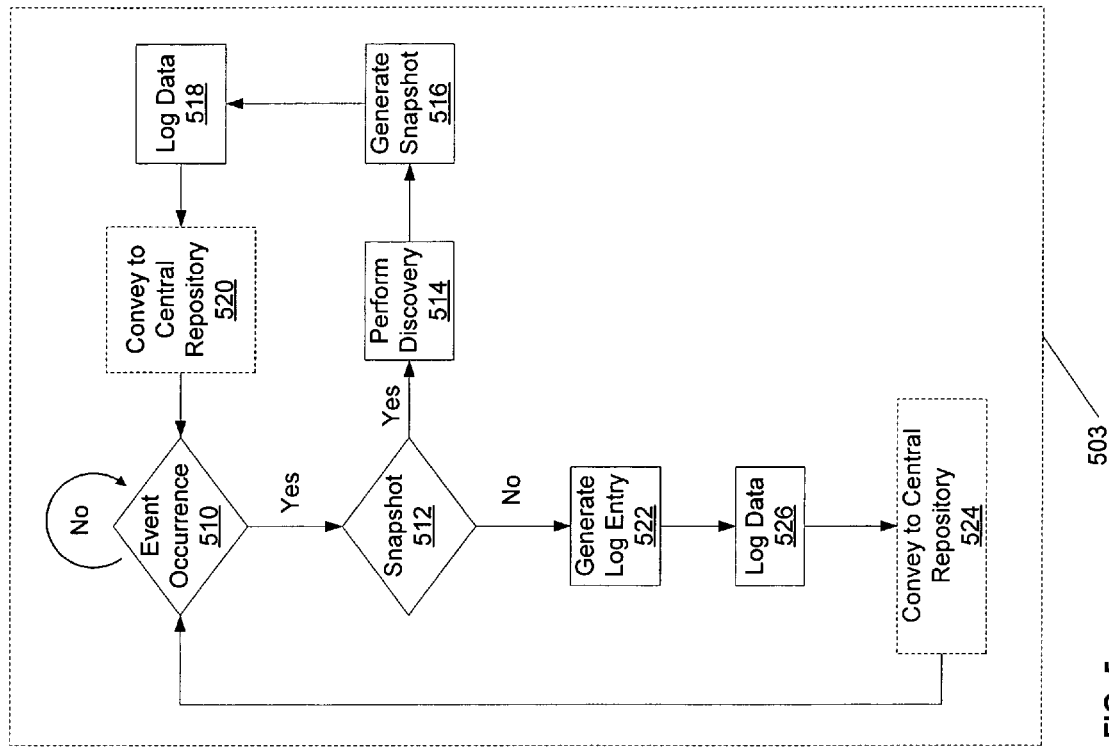
FIG. 5 illustrates one embodiment of activities performed by agents within a computing system.
Figure 5:
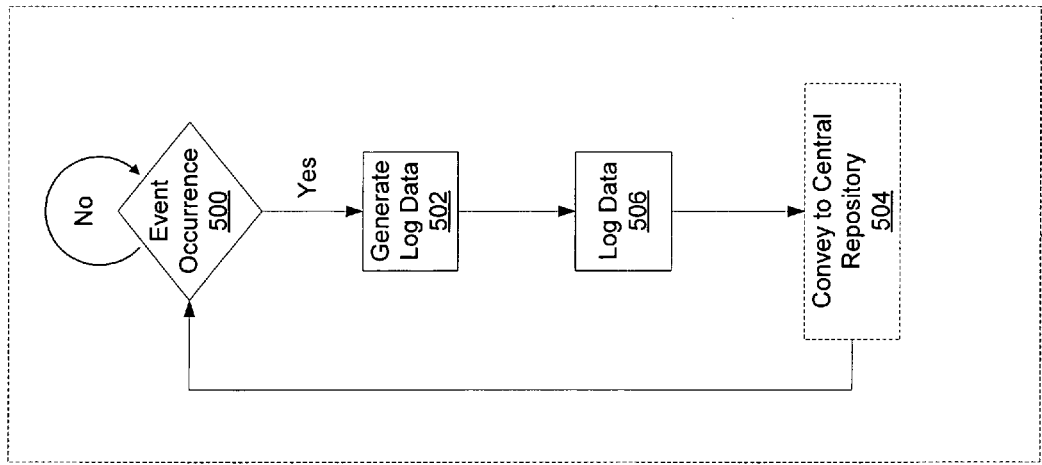

FIG. 5 illustrates an overview of a method for generating log data and snapshot data. In the embodiment shown, activities corresponding to an agent in a first host 501 and a second host 503 in a system are shown. In the example, the agent in host 503 is configured to generate snapshot data for the system. Generally speaking, the activities depicted for both agents (501, 503) may occur concurrently. In response to the detection of an event (decision block 500), an agent in the first host 501 may generate corresponding log data (block 502). As described above, an event may comprise an asynchronous event which is not predetermined or scheduled. Alternatively, an event may comprise a scheduled activity. Subsequent to generating data corresponding to the detected event, the data is logged (block 506). In one embodiment, logging data may comprise storing the data locally, storing the data in a central repository, or both. In an embodiment wherein the data is stored locally, the method may further include conveying the data to a central repository (block 504).

Similar to the activities depicted as 501, an agent in a second host 503 may log data corresponding to detected events. However, in addition, the agent in the second host 503 may also be configured to create and log snapshot data. In the example shown for the agent in the second host 503, logging of both types of data (snapshot and non-snapshot) are generally depicted as being accomplished by a single agent. However, in other embodiment, a separate snapshot generating agent may be used. In the example shown, the detection of an event (decision block 510) is followed by a determination as to whether or not the event corresponds to a snapshot (decision block 512). For example, the agent may be configured to generate a snapshot once per day at a particular time of the day. The occurrence of the particular time of day generates an event which is detected (decision block 510). However, other types of events may be detected as well. Consequently, snapshot events are distinguished from non-snapshot events. If the event is a snapshot event, the agent performs a discovery procedure (block 514) to determine the current system configuration. Based upon the information learned during discovery, snapshot data is created (block 516) and logged (block 518). In addition to storing the snapshot data, a log sequence number associated with the snapshot is also created and stored, or otherwise associated with the snapshot. The snapshot LSN may generally serve to indicate a relationship between other snapshots and events within a system. For example, a logged event with an LSN prior to (e.g., smaller than) the LSN for a particular snapshot may indicate the snapshot was created after the occurrence of the logged event. The data may further be conveyed to a central repository (block 520). On the other hand, if the detected event is not a snapshot event, appropriate data corresponding to the detected event is created (block 522) and logged (block 526). As before, the logged data may be conveyed to a central repository (524).

In one embodiment, log data conveyed from a host to a central repository may be initially stored in the repository in a relatively raw form without significant modification. Software within the repository, or elsewhere, may then subsequently access the data conveyed to the repository and reformat or otherwise modify the data (e.g., by generating and adding log sequence numbers). The modified data may then be stored in a "final" format in a repository log file which is accessed by a graphical analysis unit. Of course, the repository log file itself may be subject to modification as appropriate.

Figure 6:
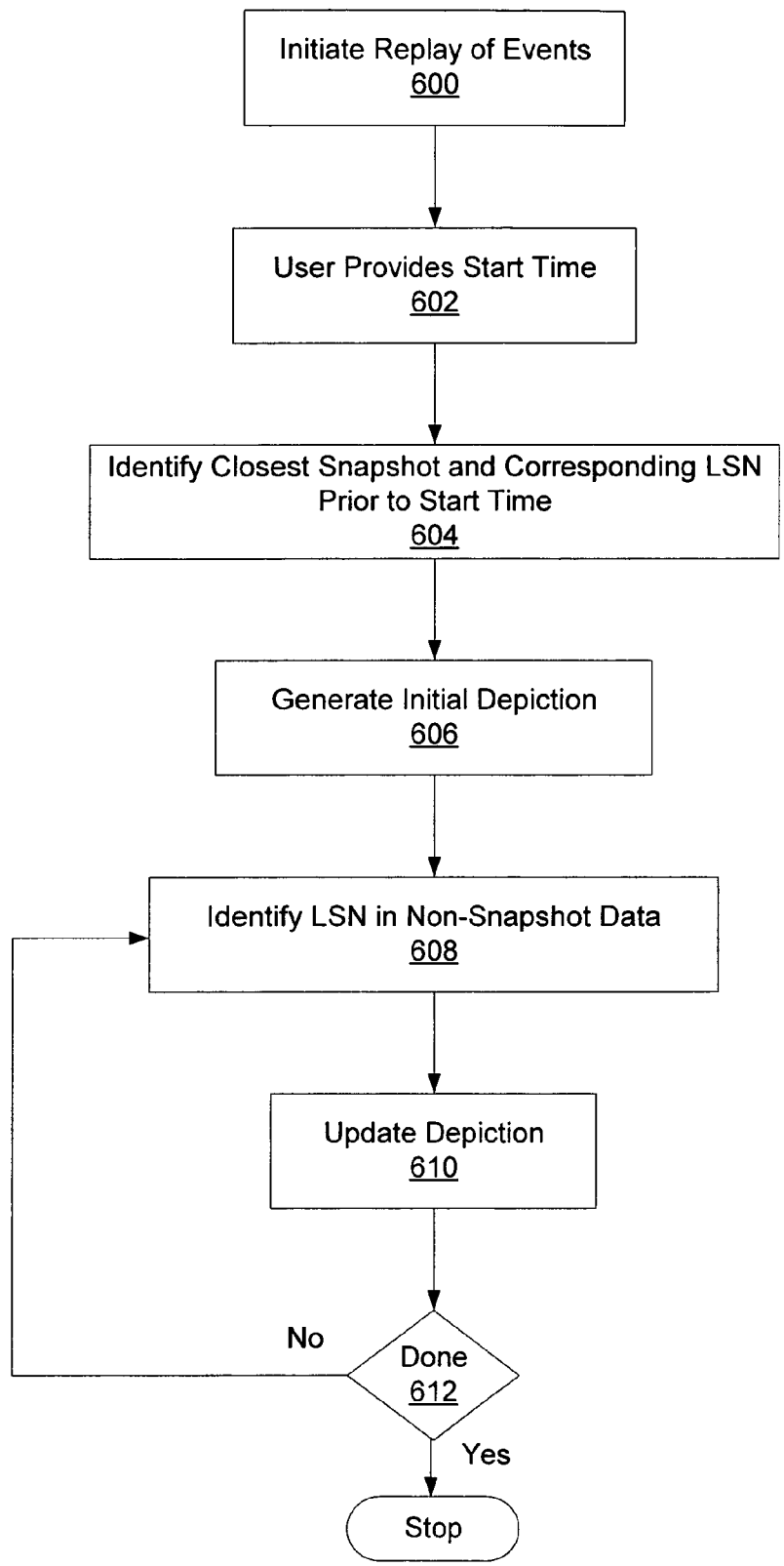
FIG. 6 illustrates one embodiment of a method for replaying events within a computing system.

Turning now to FIG. 6, one embodiment of a method for replaying a sequence of events as discussed above is depicted. Subsequent to initiating the display and possible replay of events (block 600), a user may provide a start time (block 602) which generally indicates a point in time at which the user would like to view the system. The particular start time indicated may have any suitable resolution, depending upon the particular system. For example, start times may be indicated on monthly, daily, hourly, or any other suitable basis. Based upon the indicated start time, a nearest snapshot in time which is prior to the indicated start time is identified. In addition, the LSN associated with the snapshot is identified. As described above, the snapshot may be stored in a central repository or other location. Generally speaking, time stamps associated with stored snapshots may be used to identify the snapshot nearest in time, and prior to, the indicated start time. Once the snapshot has been identified, an initial image may be generated using the data in the snapshot. The initial image generally depicts the system, or selected components, at the time the snapshot was created. In response to an indication to replay events following the state of the system at the time of the snapshot, the next LSN is identified from the non-snapshot data (block 608) and used to update the displayed depiction. Assuming a continuous replay is indicated, the method walks through the non-snapshot data identifying LSNs in sequence and updating the depiction for each identified LSN. Once an indication that the replay sequence is done is received or detected (e.g., the end of the logged events has been reached, a user indicated end time has been reached, or otherwise), the flow stops.

As described above, replay is not limited to a simple continuous forward sequence. A user may provide input which indicates a desire to move backward through the events, jump to specific points in time, pause, move in larger increments, or any other movement desired. In each of these cases, the depicted image is updated to reflect the points in time indicated.

Various embodiments may further include receiving, sending or storing instructions and/or data upon a computer accessible medium that implement the above described functionality. Generally speaking, a computer accessible medium may include storage media or memory media such as magnetic or optical media, e.g., disk or CD-ROM, volatile or non-volatile media such as RAM, ROM, MEMS (Micro Electro-Mechanical Systems) memory, Flash memory, etc., as well as transmission media or signals such as electrical, electromagnetic, or digital signals, conveyed via a communication medium such as network and/or a wireless link.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A system comprising:
a plurality of hosts; and
one or more storage devices;
wherein a first host of the plurality of hosts is configured to:
receive an indication identifying a computing system;
receive an indication identifying a point in time;
access stored data within the one or more storage devices which corresponds to the computing system;
identify snapshot data in the stored data which is prior to, and nearest in time, the indicated point in time, and utilize the snapshot data to visually depict a state of the computing system at a time the snapshot data was created; and
identify non-snapshot data in the stored data, and utilize the non-snapshot data to visually depict changes in the state of the computing system over time.

2. The system as recited in claim 1, wherein said stored data is generated by one or more of the plurality of hosts and comprises data corresponding to events and snapshots within the computing system, and wherein the hosts are configured to generate and store log sequence numbers corresponding to the events and snapshots, wherein the log sequence numbers are indicative of a temporal relationship between said events and/or snapshots.

3. The system as recited in claim 2, wherein the first host is configured to:
identify a log sequence number which corresponds to the snapshot data; and
identify one or more log sequence numbers which correspond to one or more corresponding events which are indicated by the non-snapshot data.

4. The system as recited in claim 3, wherein identifying the non-snapshot data in the stored data by the first host comprises identifying non-snapshot data log sequence numbers which follow the log sequence number which corresponds to the snapshot data.

5. The system as recited in claim 4, wherein the first host is further configured to walk through the non-snapshot data log sequence numbers and update a visual depiction of the state as indicated by the data corresponding to the non-snapshot data log sequence numbers.

6. The system as recited in claim 2, wherein said snapshot data is stored subsequent to performing a discovery procedure to determine a configuration of the computing system.

7. The system as recited in claim 6, wherein said state is indicative of a configuration of the computing system.

8. The system as recited in claim 7, wherein the first host is further configured to capture and store data indicative of a configuration corresponding to a currently depicted state of the computing system.

9. The system as recited in claim 2, wherein the first host is further configured to display an interface which enables a user to transition forward and backward in time to depict corresponding states of the computing system.

10. A method comprising:
identifying a computing system;
indicating a point in time;
accessing stored data which corresponds to the computing system;
identifying snapshot data in the stored data which is prior to, and nearest in time, the indicated point in time, and utilizing the snapshot data to visually depict a state of the computing system at a time the snapshot data was created; and
identifying non-snapshot data in the stored data, and utilizing the non-snapshot data to visually depict changes in the state of the computing system over time.

11. The method as recited in claim 10, wherein the stored data comprises data corresponding to events and snapshots within the computing system, and wherein the method further comprising generating and storing log sequence numbers corresponding to the events and snapshots, wherein the log sequence numbers are indicative of a temporal relationship between said events and/or snapshots.

12. The method as recited in claim 11, further comprising:
identifying a log sequence number which corresponds to the snapshot data; and
identifying one or more log sequence numbers which correspond to one or more corresponding events which are indicated by the non-snapshot data.

13. The method as recited in claim 12, wherein identifying the non-snapshot data in the stored data comprises identifying non-snapshot data log sequence numbers which follow the log sequence number which corresponds to the snapshot data.

14. The method as recited in claim 13, further comprising walking through the non-snapshot data log sequence numbers and updating a visual depiction of the state as indicated by the data corresponding to the non-snapshot data log sequence numbers.

15. The method as recited in claim 11, wherein said state is indicative of a configuration of the computing system.

16. The method as recited in claim 15, further comprising capturing and storing data indicative of a configuration corresponding to a currently depicted state of the computing system.

17. The method as recited in claim 11, further comprising displaying an interface which enables a user to transition forward and backward in time to depict corresponding states of the computing system.

18. A non-transitory computer readable storage medium comprising program instructions which are executable to: receive an indication identifying a computing system; receive an indication identifying a point in time access stored data which corresponds to the computing system; identify snapshot data in the stored data which is prior to, and nearest in time, the indicated point in time, and utilize the snapshot data to visually depict a state of the computing system at a time the snapshot data was created; and identify non-snapshot data in the stored data, and utilize the non-snapshot data to visually depict changes in the state of the computing system over time.

19. The non-transitory computer readable storage medium as recited in claim 18, wherein said stored data comprises data corresponding to events and snapshots within the computing system, and wherein the hosts are configured to generate and store log sequence numbers corresponding to the events and snapshots, wherein the log sequence numbers are indicative of a temporal relationship between said events and/or snapshots.

20. The non-transitory computer readable storage medium as recited in claim 19, wherein the program instructions are further executable to walk through the non-snapshot data log sequence numbers and update a visual depiction of the state as indicated by the data corresponding to the non-snapshot data log sequence numbers.

\* \* \* \* \*